(12) United States Patent
Wang

(10) Patent No.: US 11,953,050 B2
(45) Date of Patent: Apr. 9, 2024

(54) FASTENER STRUCTURE

(71) Applicant: FIVETECH TECHNOLOGY INC., New Taipei (TW)

(72) Inventor: Ting-Jui Wang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 0 days.

(21) Appl. No.: 18/108,673

(22) Filed: Feb. 13, 2023

(65) Prior Publication Data

US 2023/0193935 A1 Jun. 22, 2023

Related U.S. Application Data

(62) Division of application No. 16/932,850, filed on Jul. 20, 2020, now Pat. No. 11,629,739.

(30) Foreign Application Priority Data

Jul. 30, 2019 (TW) .................................. 108210022

(51) Int. Cl.
*F16B 5/02* (2006.01)
*F16B 35/04* (2006.01)

(52) U.S. Cl.
CPC ............ *F16B 5/0266* (2013.01); *F16B 35/04* (2013.01); *F16B 5/02* (2013.01)

(58) Field of Classification Search
CPC .......... F16B 5/004; F16B 5/02; F16B 5/0266; F16B 19/109; F16B 21/086; F16B 21/125; F16B 35/04; F16B 39/284

USPC .......................... 411/337, 339, 347, 383, 508
See application file for complete search history.

(56) References Cited

U.S. PATENT DOCUMENTS

| | | | | |
|---|---|---|---|---|
| 6,238,155 | B1* | 5/2001 | Aukzemas | F16B 39/28 411/352 |
| 8,690,506 | B2* | 4/2014 | Wang | F16B 19/109 411/347 |
| 8,939,691 | B2* | 1/2015 | Tseng | F16B 21/04 411/347 |
| 11,629,739 | B2* | 4/2023 | Wang | F16B 5/0266 411/337 |
| 2004/0003508 | A1* | 1/2004 | Wu | F16B 5/0208 33/613 |
| 2011/0067219 | A1* | 3/2011 | Wang | F16B 5/0208 29/428 |
| 2012/0148339 | A1* | 6/2012 | Wang | F16B 13/128 411/33 |
| 2017/0146050 | A1* | 5/2017 | Wang | F16B 39/284 |

* cited by examiner

*Primary Examiner* — Roberta S Delisle

(57) ABSTRACT

A fastener structure includes a fastener having a stem portion and at least one movement portion. The stem portion has a fastening section. The movement portion is formed on the stem portion and has a retaining section. With these arrangements, the retaining section of the movement portion can be detachably assembled to a first object and the fastening section can be then detachably assembled or fastened to a second object. In this way, at least two objects can be connected to and disconnected from one another in a quick and repeatable manner.

20 Claims, 12 Drawing Sheets

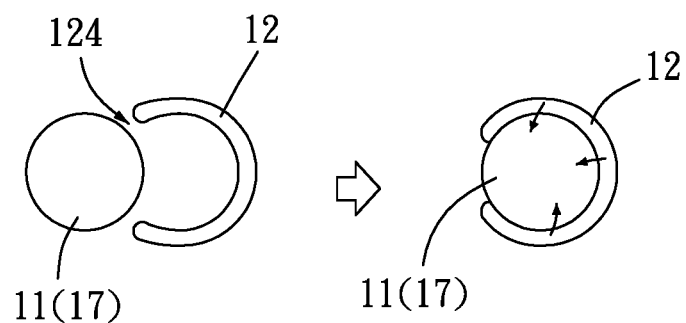
FIG. 16
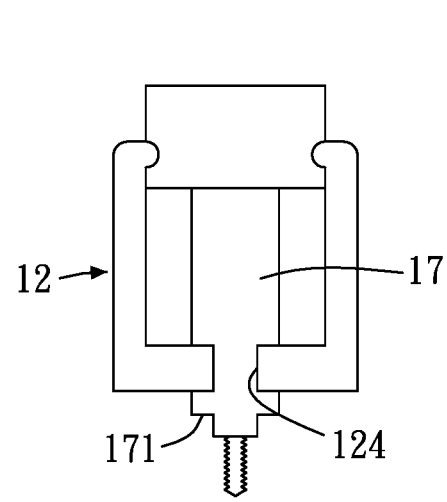 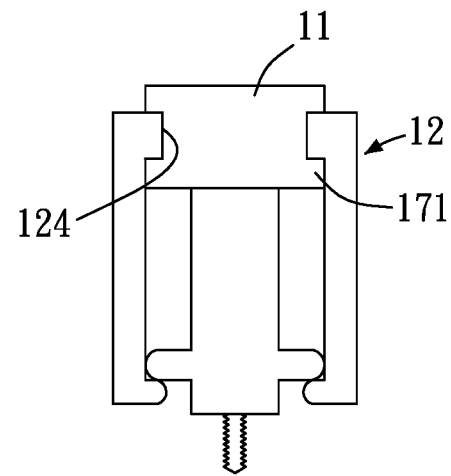
FIG. 17　　　FIG. 18

FASTENER STRUCTURE

CROSS-REFERENCE TO RELATED APPLICATION

This application is a divisional patent application of U.S. application Ser. No. 16/932,850 filed on Jul. 20, 2020, the entire contents of which are hereby incorporated by reference for which priority is claimed under 35 U.S.C. § 121.

BACKGROUND OF THE INVENTION

1. Field of the Invention

The present disclosure relates to a fastener structure, and in particular to a fastener structure that enables at least two objects to be connected to and disconnected from one another in a quick and repeatable manner.

2. Description of the Related Art

Generally, screws are used in the case of connecting at least two objects or three objects to one another.

However, while the above manner that has long been used to fix objects to one another can indeed hold at least two objects together in an uneasily separable manner, a disadvantage thereof is that the objects can not be so easily assembled in the fastening process. Further, after fixing the objects with screws, at least one of the objects can not be easily demounted.

It is therefore tried by the inventor to develop a fastener structure that enables at least two objects to be connected to and disconnected from one another in a quick and repeatable manner.

BRIEF SUMMARY OF THE INVENTION

An objective of the present disclosure is to overcome the drawbacks of the prior art by providing a fastener structure that enables at least two objects to be connected to and disconnected from one another in a quick and repeatable manner.

To achieve at least the above objective, a fastener structure provided according to a first embodiment of the present disclosure includes a fastener having a stem portion and at least one movement portion. The stem portion has a fastening section, and the movement portion is formed on the stem portion and has a retaining section.

In the above fastener structure, the stem portion further has a head section.

In the above fastener structure, the stem portion further has a head section, and a recess or spacing section is formed between the head section and the movement portion to provide a connecting section, and the recess serves as a space allowing the movement portion to be elastically deformable and restorable.

In the above fastener structure, the fastening section can be an externally threaded element, a male fastening element, a female fastening element, a cylinder, a flexible fastening element or a hook.

In the above fastener structure, the fastener is connected to a first object while the fastening section is assembled or fastened to a second object.

In the above fastener structure, the movement portion has a handling section located opposite to the retaining section. At the handling section, a force can be easily applied to displace the retaining section of the movement portion.

In the above fastener structure, a connecting section is formed between the movement portion and the stem portion.

In an embodiment of the above fastener structure, the connecting section is integrally formed with the stem portion or the movement portion.

In another embodiment of the above fastener structure, the connecting section is connected to the stem portion or the movement portion via a fixing section.

In the above fastener structure, the connecting section is flexible, so that the movement portion is allowed for elastic displacement.

In an embodiment of the above fastener structure, the movement portion is assembled to the stem portion via a fixing section.

In an embodiment of the above fastener structure, the fixing section is a bolting element.

In the above fastener structure, the movement portion is formed by in-mold injection molding or is formed by in-mold insert molding with the stem portion placed in the mold.

In the above fastener structure, it further includes a first elastic element, which has an end pressed against the movement portion and another end against the head section, such that the movement portion is allowed for elastic displacement.

In the above fastener structure, the first elastic element can be a spring or a coil spring, a torsion spring, a flat spring, or a column-shaped elastomer.

In the above fastener structure, the retaining section of the movement portion is used to engage with a catching section of a first object.

In an embodiment of the above fastener structure, it further includes a body member, which is movably assembled or connected to the fastener.

In the above fastener structure, the body member has an abutting section,

In the above fastener structure, the body member has an abutting section, on which the retaining section of the movement portion is upwardly abutted.

In the above fastener structure, it further includes a second elastic element, which has an end pressed against the body member and another end against the stem portion.

In the above fastener structure, the second elastic element can be a spring or a coil spring, a torsion spring, a flat spring, or a column-shaped elastomer.

In an embodiment of the above fastener structure, the body member has an assembling section.

In the above fastener structure, the body member has an assembling section for assembling to a first object.

In an embodiment of the above fastener structure, the retaining section has a guiding section and the abutting section has a corresponding guiding section.

In the above fastener structure, the guiding section or the corresponding guiding section can be a slant surface, a curved surface, a cambered surface, a protrusion, a dent, a flat surface, or a stepped surface.

In the above fastener structure, an external force can be applied at the retaining section of the movement portion, so that the retaining section is engaged with a catching section of a first object, or is engaged with the abutting section of the body member.

In the above fastener structure, the movement portion has a handling section opposite to the retaining section. By applying a force at the handling section, the retaining section is brought to an outward expanded state for engaging with the catching section of the first object, or for engaging with the abutting section of the body member.

In the above fastener structure, the stem portion further has a head section, and the body member is movably assembled to the head section. Alternatively, the body member is movably assembled to the fastening section.

In the above fastener structure, the head section has a limiting section, and the body member has a corresponding limiting section. The limiting section and the corresponding limiting section are able to engage with and accordingly limit one another to a fixed location.

In an embodiment of the above fastener structure, the fastening section has a limiting section, and the body member has a corresponding limiting section. The limiting section and the corresponding limiting section are able to engage with and accordingly limit one another to a fixed location.

A fastener structure according to another embodiment of the present disclosure includes a fastener having a stem portion and a body member. The stem portion is movably assembled to the body member and has a fastening section. The body member has a movement portion, and the movement portion has a retaining section.

In the above fastener structure, the stem portion has an abutting section.

In the above fastener structure, the movement portion has a retaining opening capable of retaining the body member thereto.

In the above fastener structure, the body member or the stem portion has a stop section for limiting the movement portion to a fixed location.

In the above fastener structure, the movement portion is formed by in-mold injection molding or is formed by in-mold insert molding with the stem portion placed in the mold.

In an embodiment of the above fastener structure, the movement portion is a flexible structure having slots formed thereon.

A fastener structure according to a further embodiment of the present disclosure includes a fastener having a stem portion and a body member. The stem portion is movably assembled to the body member and has a fastening section. The body member has a movement portion, and the movement portion has a retaining section.

A fastener structure according to a still further embodiment of the present disclosure includes a fastener having a stem portion and at least one movement portion. The movement portion is formed on the stem portion and has a retaining section.

A fastener structure according to a still further embodiment of the present disclosure includes a fastener having a stem portion and a body member. The stem portion and the body member are movably assembled to each other. The body member has a movement portion, which has a retaining section.

Thus, the fastener structure according to the present disclosure can be removably assembled to a first object using its retaining section and then removably assembled or fastened to a second object using its fastening section, so as to connect and disconnect at least two objects to and from one another in a quick and repeatable manner.

BRIEF DESCRIPTION OF THE DRAWINGS

FIG. 16 is a sectional view showing a fastener structure according to an eleventh embodiment of the present disclosure.

FIG. 17 is a sectional view showing a fastener structure according to a twelfth embodiment of the present disclosure.

FIG. 18 is a sectional view showing a fastener structure according to a thirteenth embodiment of the present disclosure.

DETAILED DESCRIPTION OF THE INVENTION

To facilitate understanding of the objects, characteristics and effects of this present disclosure, embodiments together with the attached drawings for the detailed description of the present disclosure are provided. It is noted the present disclosure can be implemented or applied in other embodiments, and many changes and modifications in the described embodiments can be carried out without departing from the spirit of the disclosure, and it is also understood that the preferred embodiments are only illustrative and not intended to limit the present disclosure in any way.

Figure 1:
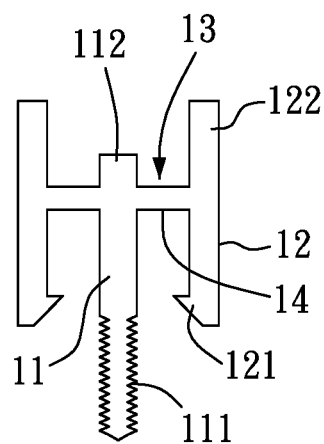
FIG. 1 is a schematic view showing the appearance of a fastener structure according to a first embodiment of the present disclosure.
Figure 2:
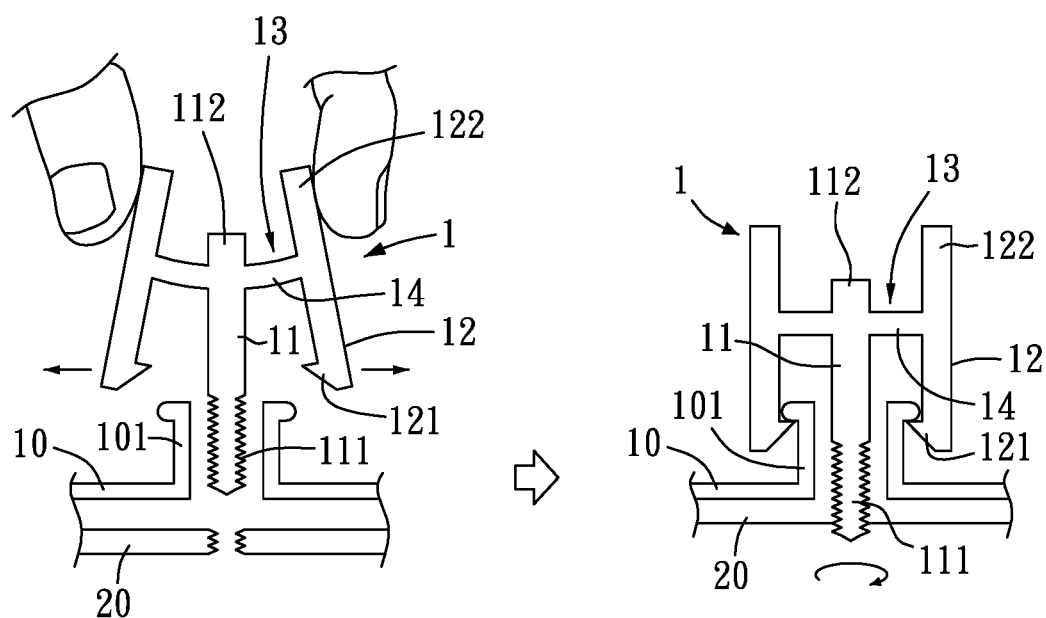
FIG. 2 shows the use of the fastener structure according to the first embodiment of the present disclosure.

Please refer to FIGS. 1 and 2, in which a fastener structure according to a first embodiment of the present disclosure is shown. As shown, in the first embodiment, the fastener structure includes a fastener 1 having a stem portion 11 and at least one movement portion 12. The stem portion 11 has a fastening section 111, and the movement portion 12 is formed on the stem portion 11 and has a retaining section 121. In an operable embodiment, the stem portion 11 may be formed without the fastening section.

To use the fastener structure according to the first embodiment of the present disclosure, first cause the retaining section 121 of the movement portion 12 to assemble and connect to a catching section 101 on a first object 10, so that the fastener 1 is movably located on the first object 10. Then, rotates the fastener 1 to assemble and connect the fastening section 111 to a second object 20. On the other hand, when it is desired to separate the first object 10 from the second object 20, simply rotate the fastener 1 reversely to loosen and detach the fastening section 111 from the second object 20. In this way, the first object 10 and the second object 20 can be connected to and disconnected from one another in a quick and repeatable manner.

In the first embodiment of the present disclosure, the movement portion 12 has a handling section 122 located opposite to the retaining section 121. At the handling section 122, a force can be easily applied to displace the retaining section 121 of the movement portion 12.

In the first embodiment of the present disclosure, the stem portion 11 further has a head section 112. A recess 13 or a spacing section is formed between the movement portion 12 and the head section 112 to provide a connecting section 14 between the movement portion 12 and the stem portion 11, such that the recess 13 serves as a space that allows the movement portion 12 to be elastically deformable and restorable. Thus, when a force is inwardly applied at the handling section 122, the movement portion 12 can be elastically deformed toward the recess 13, causing the retaining section 121 to expand outward. The outward expanded retaining section 121 can be more easily aligned with the catching section 101 of the first object 10. At this point, the handling section 122 can be released from the applied force, so that the movement portion 12 is elastically restored and the retaining section 121 is retained to the catching section 101, enabling the fastener 1 to be movably set on the first object 10. Then, the fastener 1 is rotated to assemble or fasten to the second object 20. When it is desired to separate the first object 10 from the second object 20, just rotate the fastener 1 reversely to loosen and detach the fastening section 111 from the second object 20. In this way, the first object 10 and the second object 20 can be connected to and disconnected from one another in a quick and repeatable manner.

In the first embodiment of the present disclosure, the connecting section 14, the stem portion 11 and the movement portion 12 are integrally formed. The connecting section 14 is flexible to allow for an elastic displacement of the movement portion 12 relative to it. Therefore, when a force is applied at the handling section 122, the flexible connecting section 14 and the elastically deformable and restorable space in the recess 13 together enable the retaining section 121 at the other end of the movement portion 12 to temporarily expand outward for easy alignment with the catching section 101 of the first object 10. Then, the handling section 122 is released from the applied force, and the movement portion 12 is elastically restored to its initial state. In the meantime, the retaining section 121 is engaged with the catching section 101, and the fastener 1 is movably set on the first object 10. In this way, the fastener 1 can be easily operated and quickly assembled to an object, i.e. the first object 10.

Figure 3:
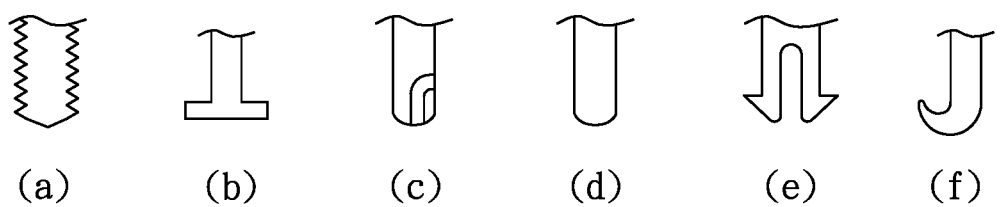
FIG. 3 illustrates differently structured fastening sections available for a fastener of the present disclosure.

Please refer to FIG. 3. In the first embodiment of the present disclosure, the fastening section 111 can be an externally threaded element as shown in FIG. 3(a), a male fastening element as shown in FIG. 3(b), a female fastening element as shown in FIG. 3(c), a cylinder as shown in FIG. 3(d), a flexible fastening element as shown in FIG. 3(e), or a hook as shown in FIG. 3(f).

Figure 4:
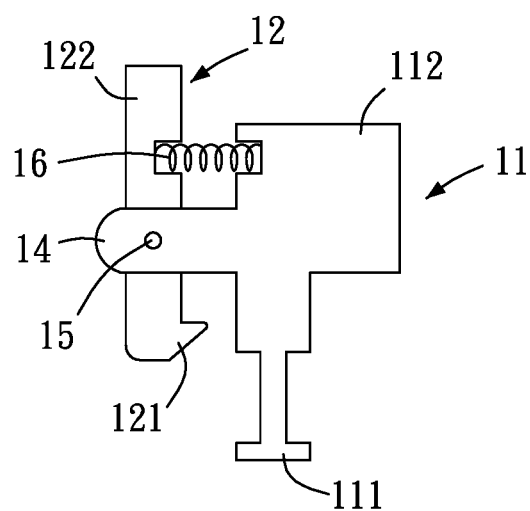
FIG. 4 is a schematic view showing the appearance of a fastener structure according to a second embodiment of the present disclosure.
Figure 5:
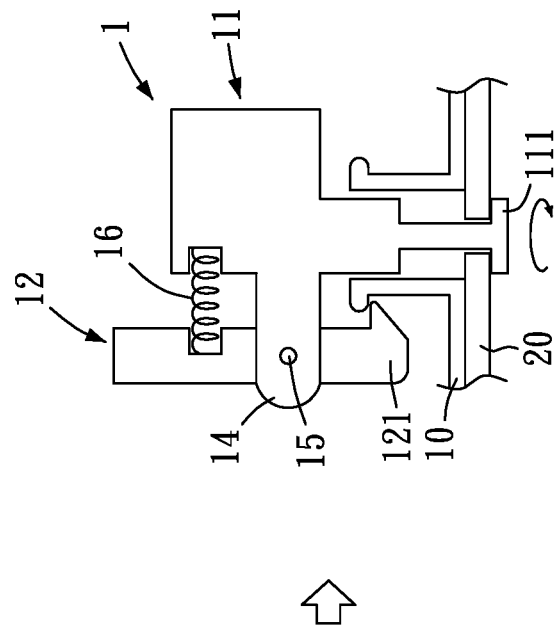
FIG. 5 shows the use of the fastener structure according to the second embodiment of the present disclosure.
Figure 5:
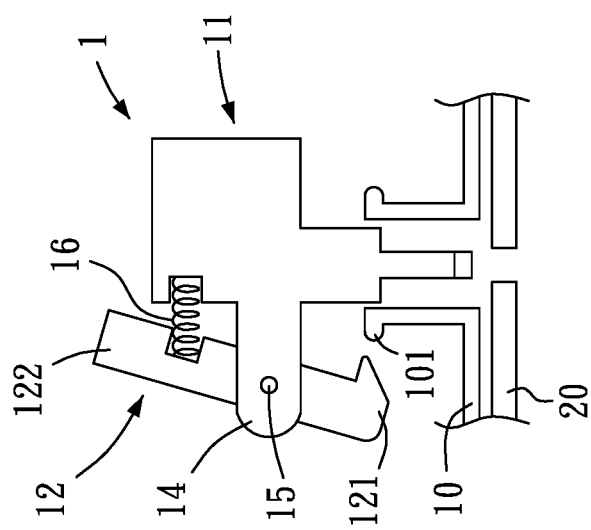
Figure 6:
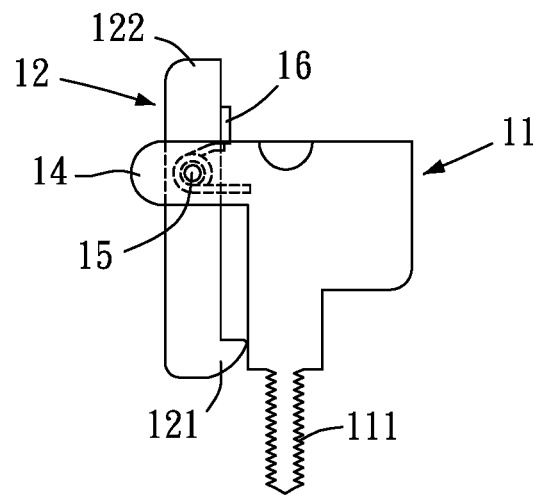
FIG. 6 is a schematic view showing the appearance of a fastener structure according to a third embodiment of the present disclosure.

Please refer to FIGS. 4 to 5, which show a fastener according to a second embodiment of the present disclosure, and to FIG. 6, which shows a fastener according to a third embodiment of the present disclosure. As shown, in the second and the third embodiment of the present disclosure, the movement portion 12 is assembled to the connecting section 14 and the stem portion 11 via a fixing section 15, and the fastener 1 further includes a first elastic element 16. The first elastic element 16 has an end pressed against the movement portion 12 and another end against the head section 112, so that the movement portion 12 is elastically movable about the fixing section 15 relative to the stem portion 11.

To use the fastener 1 in the second and the third embodiment of the present disclosure, first apply a force at the handling section 122, so that the movement portion 12 compresses the first elastic element 16. At this point, the retaining section 121 of the movement portion 12 is caused to shift outward to a location corresponding to the catching section 101 of the first object 10. Then, release the handling section 122 from the applied force and the first elastic element 16 is elastically restored to its initial state and pushes the handling section 121 of the movement portion 12 outward. In the meantime, the retaining section 121 is engaged with the catching section 101, allowing the fastener 1 to be movably connected to the first object 10. Thereafter, rotate the fastener 1 to assemble or fasten the fastening section 111 to the second object 20. When it is desired to separate the first object 10 from the second object 20, simply rotate the fastener 1 reversely to loosen and detach the fastening section 111 from the second object 20. In this way, the first object 10 and the second object 20 can be connected to and disconnected from one another in a quick and repeatable manner.

In the second and the third embodiment, the first elastic element 16 can be a spring or a coil spring as shown in FIGS. 4 and 5, a torsion spring as shown in FIG. 6, a flat spring, or a column-shaped elastomer.

Figure 7:
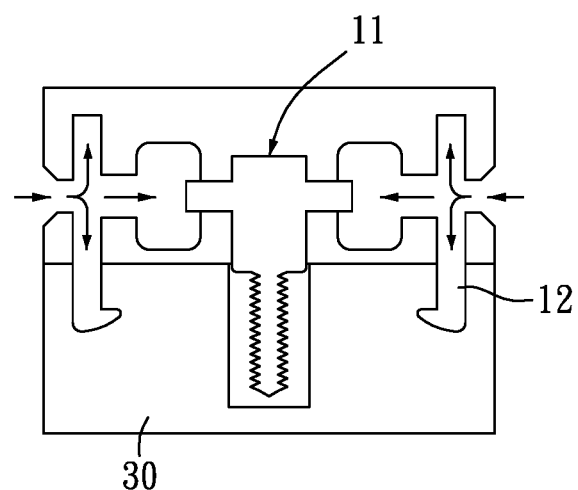
FIG. 7 shows a first way of forming the fastener structure according to the present disclosure.

Please refer to FIG. 7. In a first way of forming the fastener 1 according to the first embodiment of the present disclosure, the movement portion 12 is formed by in-mold injection molding, or formed by in-mold insert molding with the stem portion 11 placed in a mold 30.

Figure 8:
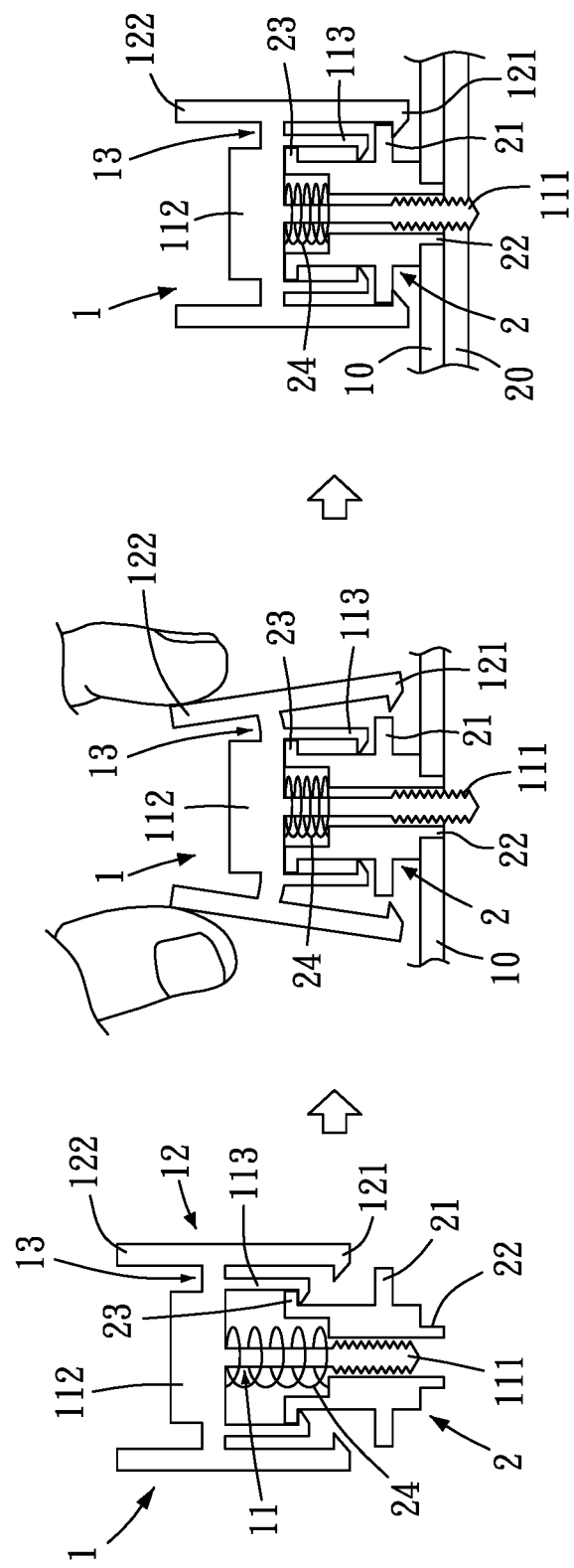
FIG. 8 shows the use of a fastener structure according to a fourth embodiment of the present disclosure.

Please refer to FIG. 8. In a fourth embodiment of the present disclosure, the fastener structure further includes a body member 2, which is movably assembled to the head section 112 of the fastener 1 and has an abutting section 21 and an assembling section 22. In the fourth embodiment, the head portion 112 has a limiting section 113 and the body member 2 has a corresponding limiting section 23. The limiting section 113 and the corresponding limiting section 23 are able to engage with and accordingly limit one another to a fixed location. The fastener 1 in the third embodiment further includes a second elastic element 24, which has an end pressed against the body member 2 and another end against the head section 112 or the stem portion 11 of the fastener 1.

To use the fastener 1 of the fourth embodiment, first connect the assembling section 22 of the body member 2 to the first object 10 and then apply a force at the handling section 122, the recess 13 allows the movement portion 12 to be elastically deformed with the retaining section 121 temporarily expanding outward. Meanwhile, the movement portion 12 is moved downward until the expanded retaining section 121 is located corresponding to the abutting section 21 of the body member 2. At this point, release the handling section 122 to allow the movement portion 12 to restore to its initial shape and the retaining section 121 shifts back to upward abut on the abutting section 21. That is, when the movement portion 12 is subjected to an external force, its retaining section 121 can be brought to engage with the abutting section 21 of the body member 2 while the second elastic element 24 is compressed to thereby firmly hold the fastener 1 to the body member 2. Thereafter, rotate the fastener 1 to assemble or fasten the fastening section 111 to the second object 20. When it is desired to disconnect the first object 10 from the second object 20, simply rotate the fastener 1 reversely to loosen and detach the fastening section 111 from the second object 20. In this way, the first object 10 and the second object 20 can be connected to and disconnected from one another in a quick and repeatable manner.

In the fourth embodiment, the second elastic element 24 can be a spring or a coil spring, a torsion spring, a flat spring or a column-shaped elastomer.

Figure 9:
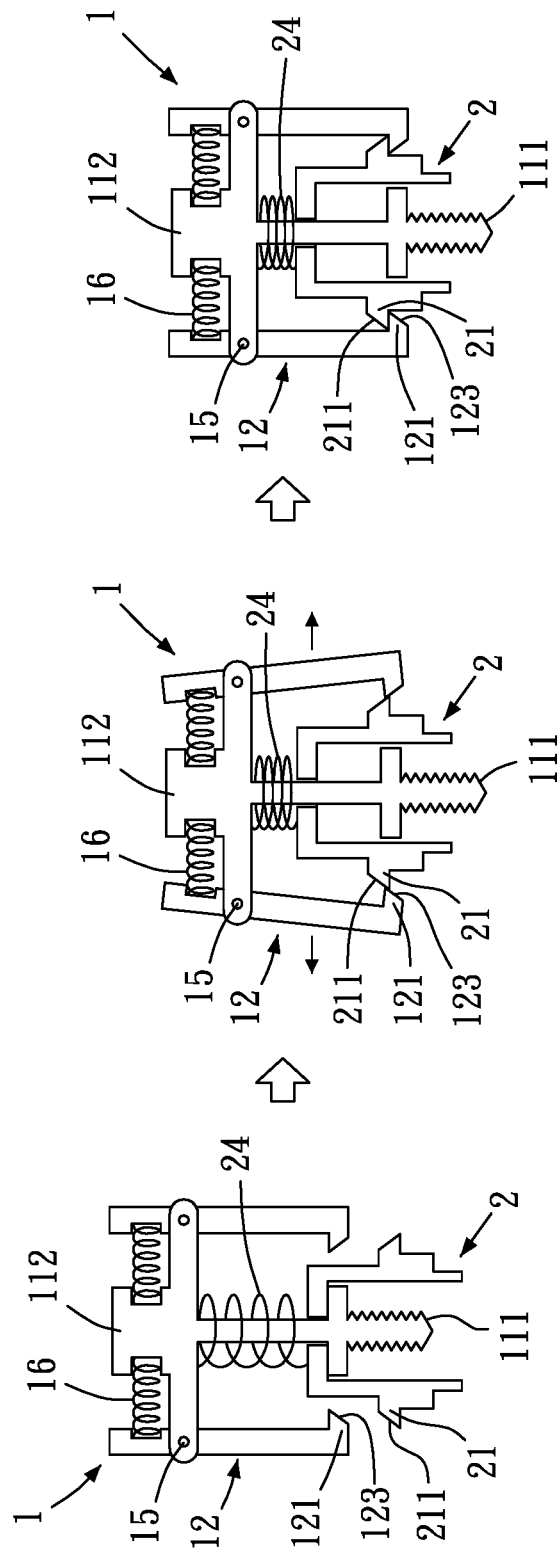
FIG. 9 shows the use of a fastener structure according to a fifth embodiment of the present disclosure.

Please refer to FIG. 9. In a fifth embodiment of the present disclosure, the movement portion 12 is connected and assembled to the stem portion 11 via a fixing section 15, which can be a bolting element. A set of first elastic elements 16 have an end pressed against the movement portion 12 and another end against the head section 112, such that the movement portion 12 is elastically movable relative to the stem portion 11. A second elastic element 24 has an end pressed against body member 2 and another end against the head section 112 or the stem portion 11. The retaining section 121 has a guiding section 123 and the abutting section 21 has a corresponding guiding section 211. By applying a force at the head section 112 or at the handling section 122, the second elastic element 24 is compressed, so that the retaining section 121 and the abutting section 21 are respectively guided by the guiding section 123 and the corresponding guiding section 211 to finally engage with one another, enabling the fastener 1 and the body member 2 to be movably connected together. When the handling section 121 is released, since the first elastic elements 16 are pressed against the movement portion 12 and the second elastic element 24 is pressed against the body member 2, the fastener 1 and the body member 2 are firmly held to each other, making the present disclosure satisfy the requirements in actual use.

In the fifth embodiment, the guiding section 123 and the corresponding guiding section 211 can be respectively a slant surface, a curved surface, a cambered surface, a protrusion, a dent, a flat surface, or a stepped surface. With these arrangements, differently structured guiding section 123 and corresponding guiding section 211 pairs are available for use according to actual need.

Figure 10:
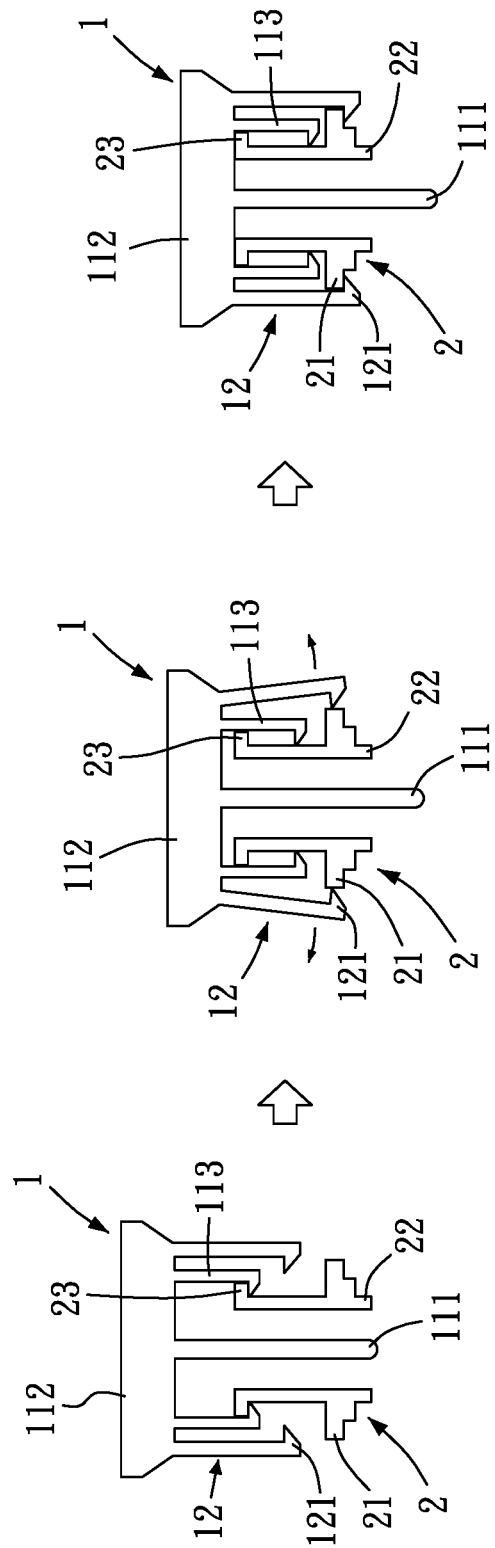
FIG. 10 shows the use of a fastener structure according to a sixth embodiment of the present disclosure.

Please refer to FIG. 10. In a sixth embodiment of the present disclosure, the head section 112 has a limiting section 113 and the body member 2 has a corresponding limiting section 23. The limiting section 113 and the corresponding limiting section 23 together allow the body member 2 to be movably assembled to the head section 121 of the fastener 1 without separating from the fastener 1. To use the fastener structure in the sixth embodiment, first connect the assembling section 22 of the body member 2 to a first object (not shown), and then apply an external force at the retaining section 121 of the movement portion 12 for the retaining section 121 to engage with the abutting section 21 of the body member 2. Thereafter, assemble or fasten the fastening section 111 to a second object (not shown), making the present disclosure satisfy the requirement in actual use.

Figure 11:
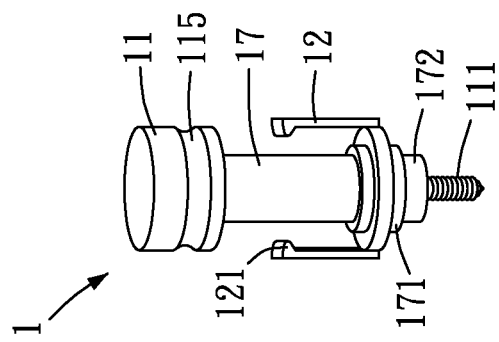
FIG. 11 is a sectional view showing a fastener structure according to a seventh embodiment of the present disclosure.

Please refer to FIG. 11. In a seventh embodiment, the fastening section 111 of the fastener 1 has a limiting section 113 and the body member 2 has a corresponding limiting section 23. The limiting section 113 and the corresponding limiting section 23 work together to limit each other to a fixed location. A second elastic element 24 has an end pressed against the body member 2 and another end against the fastening section 111, so that the body member 2 and the fastener 1 are movably assembled together, making the present disclosure satisfy the requirements in actual use.

Figure 12:
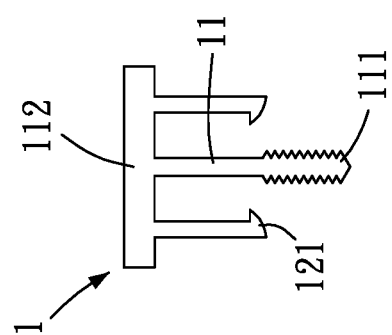
FIG. 12 is a sectional view showing a fastener structure according to an eighth embodiment of the present disclosure.

Please refer to FIG. 12. In an eighth embodiment of the present disclosure, the fastener 1 includes a stem portion 11 and a movement portion 12. The stem portion 11 has a fastening section 111 and a head section 112. The movement portion 12 is provided on the head section 112 and has a retaining section 121. To use the fastener 1 in the eighth embodiment, first hook or assemble the retaining section 121 of the movement portion 12 to an abutting section 21 of a first object (not shown), so that the fastener 1 is movably connected to the first object. Then, rotate the fastener 1 for the fastening section 111 to assemble or fasten to a second object (not shown). When it is desired to separate the first object from the second object, simply rotate the fastener 1 reversely to loosen and detach the fastening section 111 from the second object. In this way, the first object 10 and the second object 20 can be connected to and disconnected from one another in a quick and repeatable manner.

Figure 13:
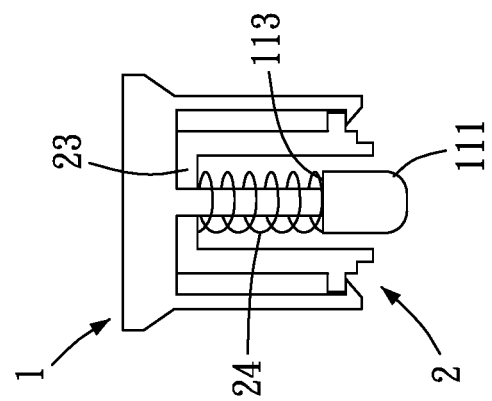
FIG. 13 is a schematic view showing the appearance of a fastener structure according to a ninth embodiment of the present disclosure.
Figure 14:
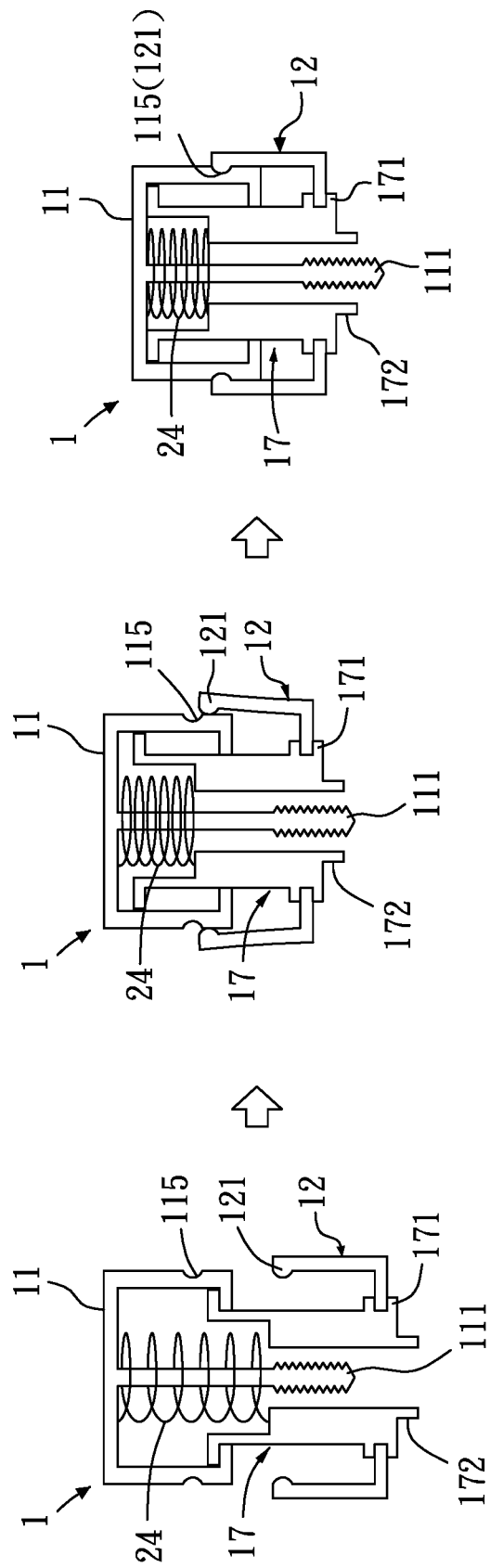
FIG. 14 is a sectional view showing the fastener structure according to the ninth embodiment of the present disclosure.
Figure 15:
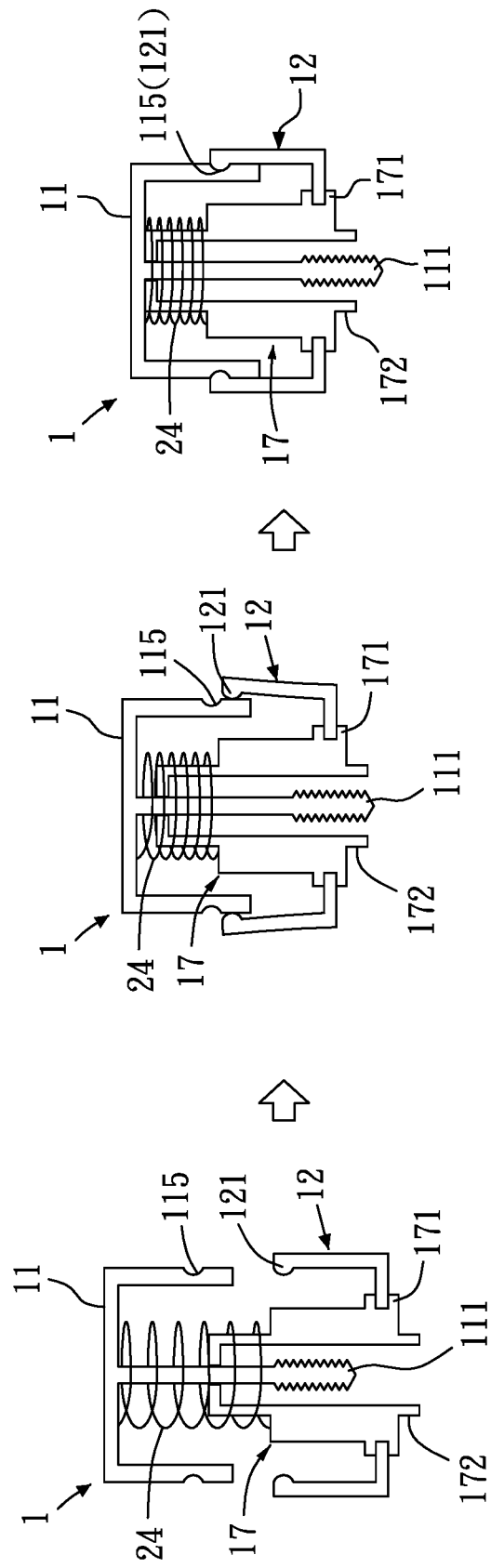
FIG. 15 is a sectional view showing a fastener structure according to a tenth embodiment of the present disclosure.

Please refer to FIGS. 13 to 14, which show a ninth embodiment of the present disclosure, and to FIG. 15, which shows a tenth embodiment of the present disclosure. As show, in the ninth and the tenth embodiments, the fastener 1 includes a stem portion 11 and a body member 17. The stem portion 11 is movably assembled to the body member 17 and has a fastening section 111 and an abutting section 115. The body member 17 and has a movement portion 12, which has a retaining section 121. The body member 17 further has a stop section 171 and an assembling section 172. Alternatively, the stop section can be otherwise formed on the stem portion 11. The stop section 171 limits the movement portion 12 to a fixed location. A second elastic element 24 has an end pressed against the stem portion 11 and another end against the body member 17. In the tenth embodiment, the second elastic element 24 has an end pressed against the stem portion 11 and another end fitted around the body member 17, as shown in FIG. 15.

To use either the ninth or the tenth embodiment, first connect the assembling section 172 of the body member 17 to a first object (not shown) and then, apply a force at the stem portion 11 for the retaining section 121 of the movement portion 12 to move to and abut on the abutting section 115 of the stem portion 11, such that the stem portion 11 and the movement portion 12 are movably connected to each other.

Meanwhile, since the second elastic element 24 is compressed to push the stem portion 11 upward, making the stem portion 11 firmly connect to the movement portion 12. Thereafter, rotate the fastener 1 for the fastening section 111 to assemble or fasten to a second object (not shown). When it is desired to separate the first object from the second object, simply rotate the fastener 1 reversely, and the fastening section 111 is loosened and detached from the second object. In this way, the first object and the second object can be connected to and disconnected from one another in a quick and repeatable manner.

Please refer to FIGS. 16 to 18, which show an eleventh, a twelfth and a thirteenth embodiment, respectively. In these embodiments, the movement portion 12 has a retaining section 121, which defines a retaining opening 124 capable of retaining the body member 17 thereto as shown in FIGS. 16 and 17, or retaining the stem portion 11 thereto, as shown in FIGS. 16 and 18. The body member 17 or the stem portion 11 has a stop section 171 for limiting the movement portion 12 to a fixed location. With these arrangements, the present disclosure can satisfy the requirements in actual use.

Figure 19:
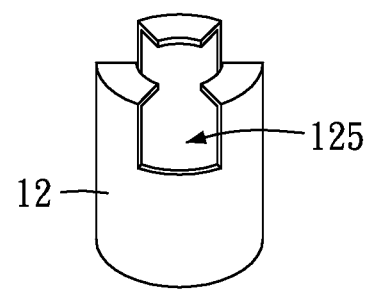
FIG. 19 is a partially sectioned perspective view showing a fastener structure according to a fourteenth embodiment of the present disclosure.

Please refer to FIG. 19. In a fourteenth embodiment, the movement section 12 is a flexible structure with slots 125 formed thereon. With this arrangement, the present disclosure can satisfy the requirements in actual use.

Figure 20:
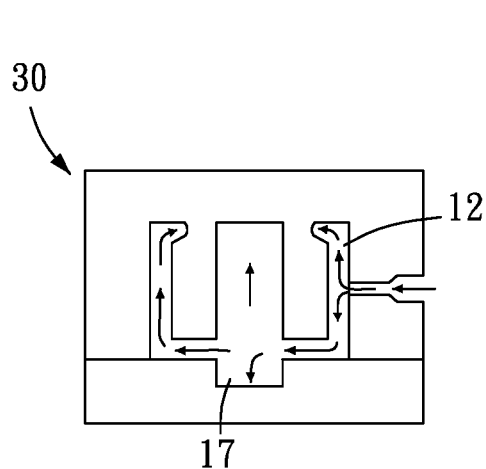
FIG. 20 shows a second way of forming the fastener structure according to the present disclosure.

Please refer to FIG. 20. In a second way of forming the fastener 1 according to the embodiments of the present disclosure that include the body member 17, the movement portion 12 is formed by in-mold injection molding, or is formed by in-mold insert molding with the body member 17 or the stem portion 11 placed in a mold 30. In this way, the present disclosure can satisfy the requirements in actual use.

Figure 21:
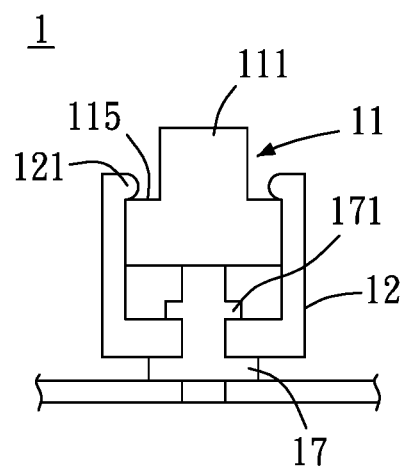
FIG. 21 is a sectional view showing a fastener structure according to a fifteenth embodiment of the present disclosure.

Please refer to FIG. 21. In a fifteenth embodiment, the fastener 1 includes a stem portion 11 and a body member 17 having a movement portion 12 provided thereon. The stem portion 11 is movably assembled to the intermediate portion 17 and has a fastening section 111 and an abutting section 115. Alternatively, in a variation of this embodiment, the stem portion 11 does not include the fastening section 111. The movement portion 12 has a retaining section 121 adapted for engaging with the abutting section 115 of the stem portion 11. In this embodiment, the abutting section 115 is a stepped section. With these arrangements, the present disclosure can satisfy the requirements in actual use.

While the present disclosure has been described by means of specific embodiments, numerous modifications and variations could be made thereto by those skilled in the art without departing from the scope and spirit of the present disclosure set forth in the claims.

What is claimed is:

1. A fastener structure, comprising a fastener having a stem portion and at least one movement portion; the stem portion having a fastening section, and the movement portion being formed on the stem portion and having a retaining section; wherein the stem portion further has a head section, such that a recess or a spacing section is formed between the head section and the movement portion to provide a connecting section; the connecting section formed between the movement portion and the stem portion; and the recess serving as a space that allows the movement portion to be elastically deformable and restorable, wherein the movement portion is a flexible structure having slots formed thereon.

2. The fastener structure according to claim 1, further comprising a first elastic element; the first elastic element having an end pressed against the movement portion and another end pressed against the head section, such that the movement portion is elastically movable relative to the head section.

3. The fastener structure according to claim 1, further comprising a body member; the body member being movably assembled to the fastener and having an assembling section, and the assembling section being connectable to a first object.

4. The fastener structure according to claim 3, wherein the body member has an abutting section, and the retaining section of the movement portion being upwardly abutted on the abutting section.

5. The fastener structure according to claim 3, further comprising a second elastic element; and the second elastic element having an end pressed against the body member and another end pressed against the fastener.

6. The fastener structure according to claim 3, wherein the stem portion has a limiting section and the body member has a corresponding limiting section; and the limiting section and the corresponding limiting section being able to engage with and accordingly limit one another to a fixed location.

7. The fastener structure according to claim 3, wherein the fastening section has a limiting section and the body member has a corresponding limiting section; and the limiting section and the corresponding limiting section being able to engage with and accordingly limit one another to a fixed location.

8. The fastener structure according to claim 3, wherein the body member has an abutting section for abutting on the retaining section.

9. The fastener structure according to claim 1, wherein the movement portion has a retaining opening capable of retaining the stem portion thereto.

10. The fastener structure according to claim 1, wherein the stem portion has a stop section for limiting the movement portion to a fixed location.

11. A fastener structure, comprising a fastener having a stem portion and at least one movement portion; the movement portion being formed on the stem portion and having a retaining section; wherein the stem portion further has a head section, such that a recess or a spacing section is formed between the head section and the movement portion to provide a connecting section; the connecting section formed between the movement portion and the stem portion; and the recess serving as a space that allows the movement portion to be elastically deformable and restorable, wherein the movement portion is a flexible structure having slots formed thereon.

12. The fastener structure according to claim 11, further comprising a first elastic element; the first elastic element having an end pressed against the movement portion and another end pressed against the head section, such that the movement portion is elastically movable relative to the head section.

13. The fastener structure according to claim 11, further comprising a body member; the body member being movably assembled to the fastener and having an assembling section, and the assembling section being connectable to a first object.

14. The fastener structure according to claim 13, wherein the body member has an abutting section, and the retaining section of the movement portion being upwardly abutted on the abutting section.

15. The fastener structure according to claim 13, further comprising a second elastic element; and the second elastic element having an end pressed against the body member and another end pressed against the fastener.

16. The fastener structure according to claim 13, wherein the stem portion has a limiting section and the body member has a corresponding limiting section; and the limiting section and the corresponding limiting section being able to engage with and accordingly limit one another to a fixed location.

17. The fastener structure according to claim 13, wherein the fastening section has a limiting section and the body member has a corresponding limiting section; and the limiting section and the corresponding limiting section being able to engage with and accordingly limit one another to a fixed location.

18. The fastener structure according to claim 13, wherein the body member has an abutting section for abutting on the retaining section.

19. The fastener structure according to claim 11, wherein the movement portion has a retaining opening capable of retaining the stem portion thereto.

20. The fastener structure according to claim 11, wherein the stem portion has a stop section for limiting the movement portion to a fixed location.

* * * * *